(12) United States Patent
Morovic et al.

(10) Patent No.: US 10,911,641 B2
(45) Date of Patent: Feb. 2, 2021

(54) COLOR HARMONY COMPLYING REPRODUCIBLE COLOR PALETTES

(71) Applicant: Hewlett-Packard Development Company, L.P., Spring, TX (US)

(72) Inventors: Jan Morovic, London (GB); Peter Morovic, Sant Cugat del Valles (ES); Josep Abad Peiro, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/614,952

(22) PCT Filed: Jul. 28, 2017

(86) PCT No.: PCT/US2017/044331
§ 371 (c)(1),
(2) Date: Nov. 19, 2019

(87) PCT Pub. No.: WO2019/022758
PCT Pub. Date: Jan. 31, 2019

(65) Prior Publication Data
US 2020/0186680 A1    Jun. 11, 2020

(51) Int. Cl.
*H04N 1/00* (2006.01)
*H04N 1/60* (2006.01)

(52) U.S. Cl.
CPC ....... *H04N 1/6066* (2013.01); *H04N 1/00352* (2013.01); *H04N 1/6075* (2013.01)

(58) Field of Classification Search
CPC .. G09G 3/2055; G09G 3/3466; G09G 3/2003; G09G 2300/0452; G09G 2300/06;
(Continued)

(56) References Cited

U.S. PATENT DOCUMENTS

| 5,416,890 A | * | 5/1995 | Beretta | G06F 3/04845 345/440 |
| 6,754,384 B1 | * | 6/2004 | Spaulding | H04N 1/6058 345/590 |

(Continued)

OTHER PUBLICATIONS

Affordable Custom Printer Profiles for a Color-managed Workflow < http://profilesbyrick.com/colormgmt101/ >.

*Primary Examiner* — Negussie Worku
(74) *Attorney, Agent, or Firm* — HP Inc. Patent Department

(57) ABSTRACT

A method is disclosed wherein data representative of a plurality of colors defined in a color space is received, the plurality of colors providing a color palette taken to be related to each other by predefined color harmony rules based on their relative positions in the color space. An irreproducible color of the color palette outside a rendering system's reproducible color gamut is determined, the reproducible color gamut having been received for a rendering system on which image data comprising colors of the color palette is to be reproduced. A suggested color for a replacement color palette also complying with the predefined color harmony rules is determined based on the reproducible color gamut to bring the color palette towards being within the rendering system's reproducible color gamut.

20 Claims, 9 Drawing Sheets

(58) Field of Classification Search
CPC ... G09G 2320/0666; G09G 2320/0686; G09G 2340/06; G09G 3/2051; G09G 5/026; G06F 3/012; G06F 3/013; G06K 9/00671; G06T 11/001; G06T 1/20; G06T 2200/28; G06T 7/73; H04N 5/23238; H04N 1/4051; H04N 1/4052
USPC .......................................................... 358/502
See application file for complete search history.

(56) References Cited

U.S. PATENT DOCUMENTS

| | | | |
|---|---|---|---|
| 7,751,081 B2* | 7/2010 | Huang | H04N 1/6058 |
| | | | 345/589 |
| 8,456,698 B2* | 6/2013 | Gil | H04N 1/54 |
| | | | 358/1.9 |
| 8,743,421 B1* | 6/2014 | Ross, Jr. | H04N 1/54 |
| | | | 358/1.9 |
| 9,134,179 B2* | 9/2015 | Chong | G06T 11/001 |
| 10,156,285 B2* | 12/2018 | Von Vopelius-Feldt | |
| | | | F16H 7/08 |
| 2010/0225935 A1* | 9/2010 | Minchew | H04N 1/6088 |
| | | | 358/1.9 |
| 2011/0149307 A1* | 6/2011 | Tin | H04N 1/6033 |
| | | | 358/1.9 |
| 2014/0282185 A1* | 9/2014 | Letts | G06F 3/04847 |
| | | | 715/771 |
| 2015/0268098 A1* | 9/2015 | Minchew | G01J 3/463 |
| | | | 345/594 |

\* cited by examiner

1

COLOR HARMONY COMPLYING REPRODUCIBLE COLOR PALETTES

BACKGROUND

Colors can be combined in such a way to produce a color palette that creates pleasing contrasts and consonances that are said to be harmonious to the human eye.

The selection of colors to make up a color palette can be performed in a design process, for example, using an appropriate color palette design tool, to create a desired overall harmonious effect between the colors of the palette. Images may then be designed using the colors of the palette to make use of this color harmony.

Rendering systems are arranged to reproduce an image. Rendering systems, such as a printing system for printing an image using a printing fluid such as one or more inks or colorants, or a display device, may be constrained in colors they can reproduce. When an image containing colors of a color palette produced in a design process is reproduced using a rendering system unable to reproduce one or more of the colors of the palette, the appearance of one or more of the colors of the rendered image may not match the colors of the designed palette. The resulting image may thus not provide the overall color harmony effect designed for in the design process.

BRIEF INTRODUCTION OF THE DRAWINGS

Examples are further described hereinafter with reference to the accompanying drawings, in which.

Figure 6A:
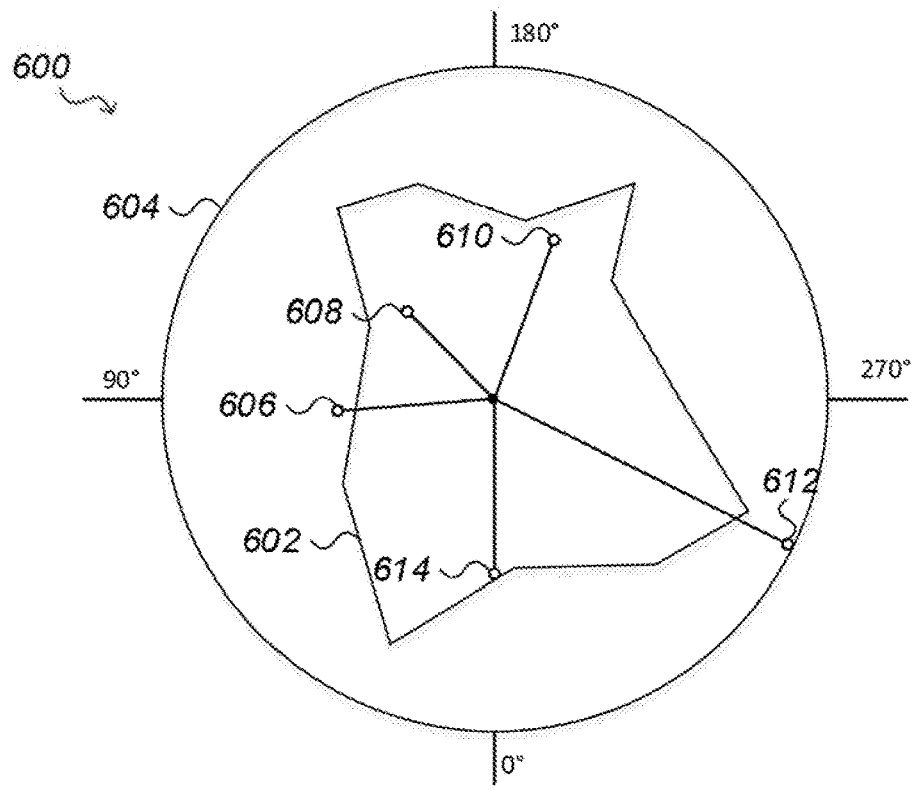
Figure 6B:
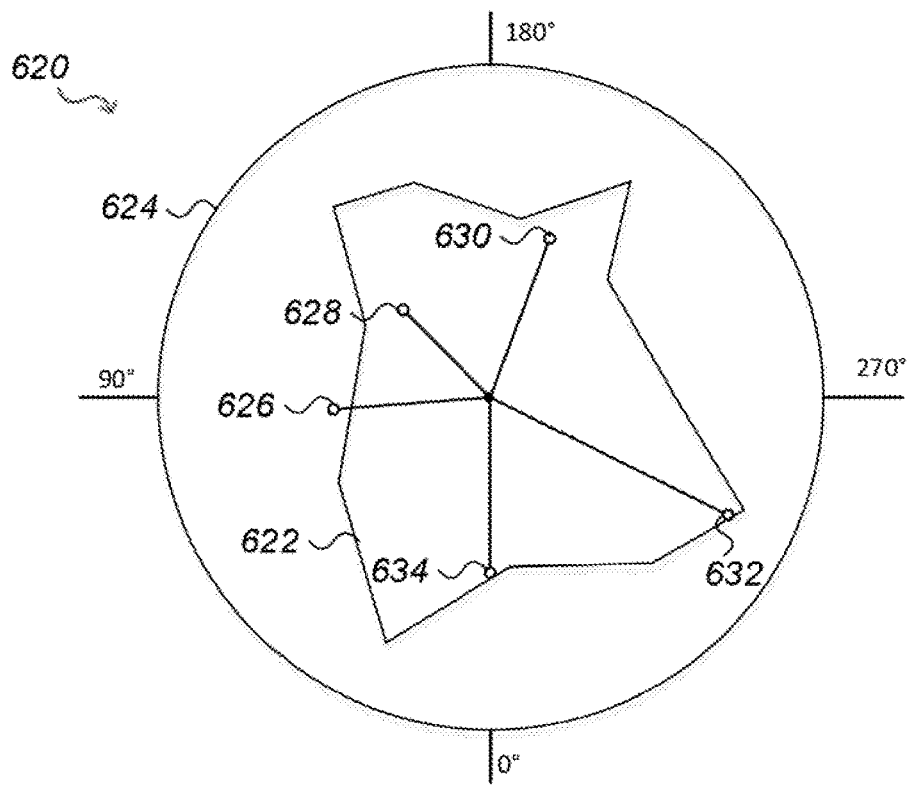

FIGS. 6a and 6b provide an example of an adjustment of a color of a color palette.

Figure 7A:
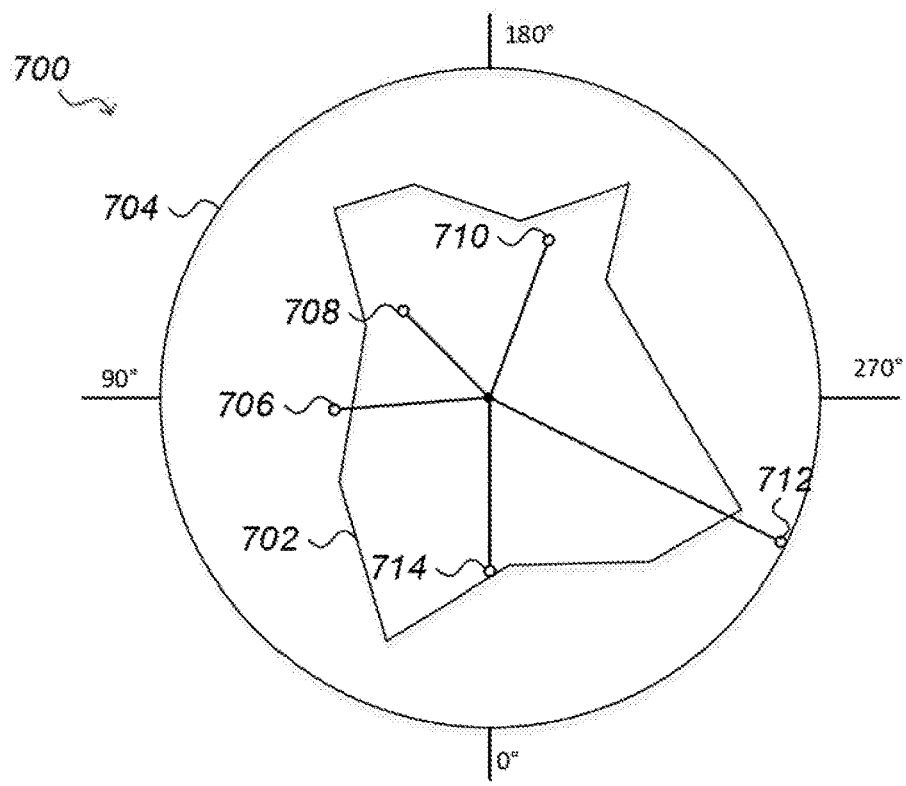
Figure 7B:
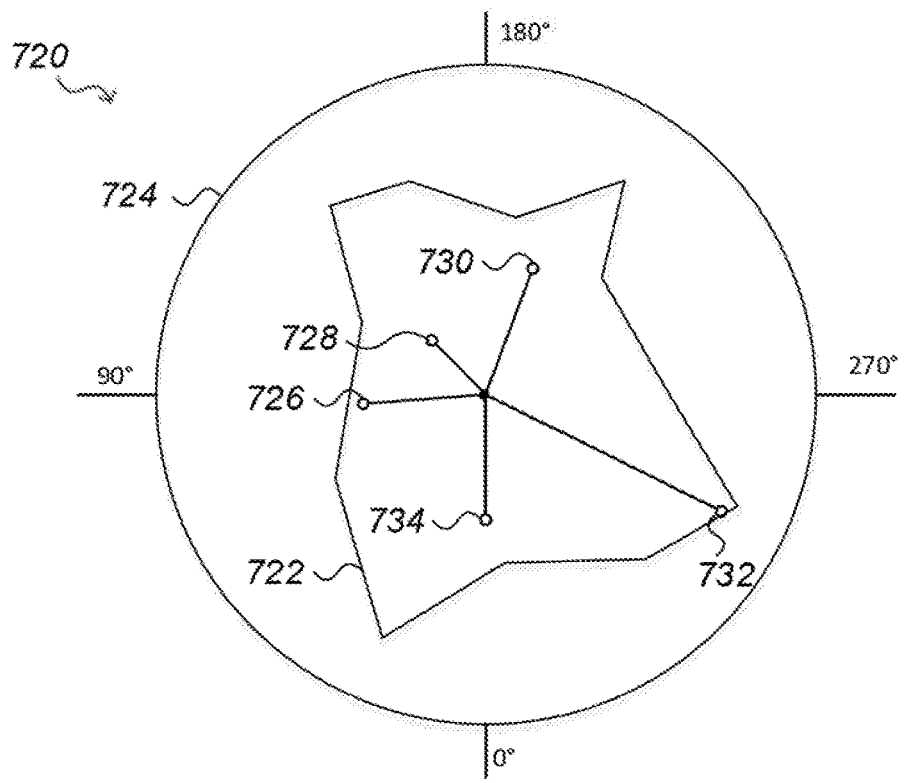

FIGS. 7a and 7b provide an example of an adjustment of a color palette by scaling.

Figure 8A:
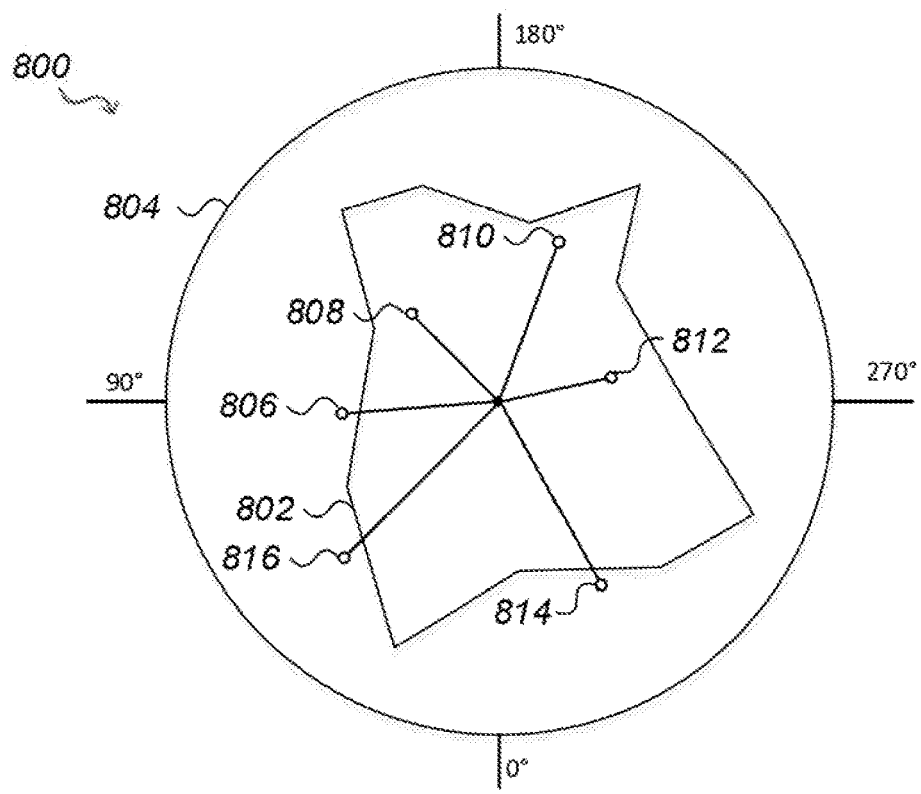
Figure 8B:
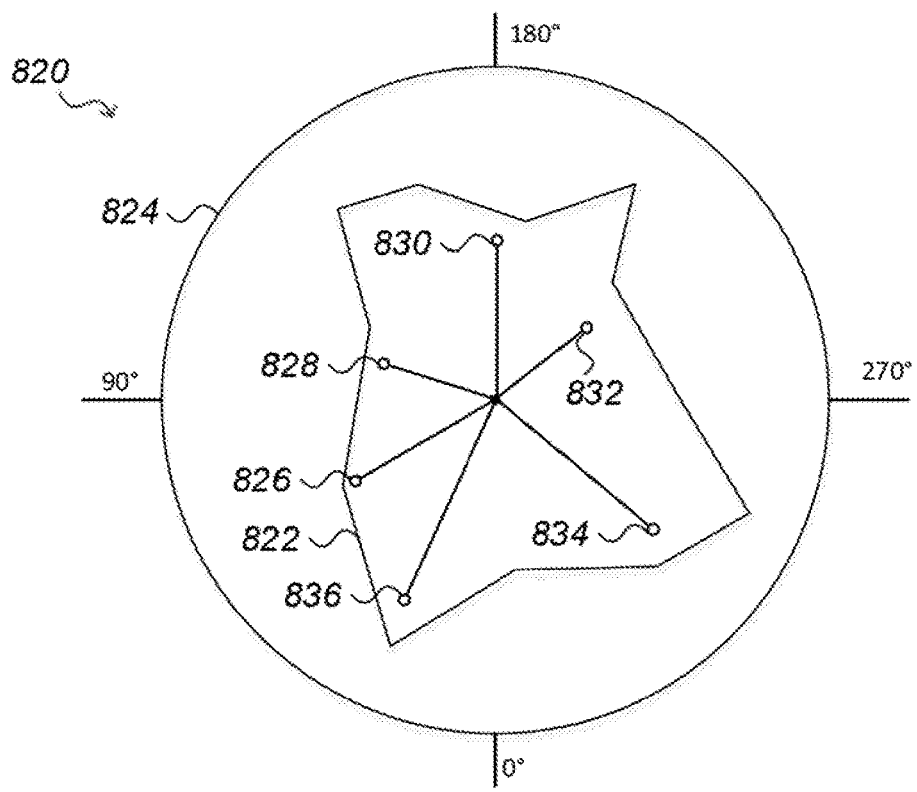

FIGS. 8a and 8b provide an example of an adjustment of a color palette by rotation.

Figure 9:
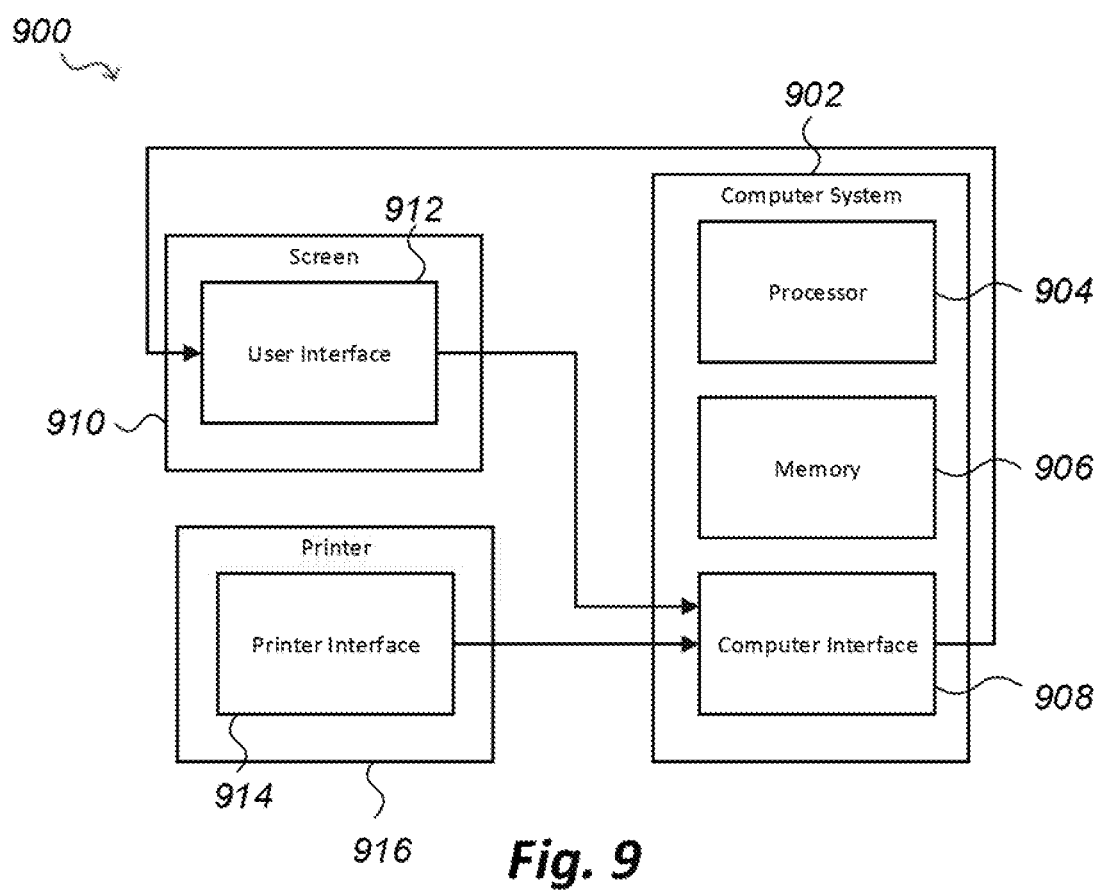

FIG. 9 is a schematic diagram shy apparatus an according to an example.

DETAILED DESCRIPTION in the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Examples provide apparatuses and methods for adjusting color palettes to the capabilities of a printing system while preserving the color harmony. The adjusted colors of the color palette can then be output by an imaging system without any modification.

A color may be represented as a value in a color space. A color space may be defined as a multi-dimensional space wherein a color value is represented by a point in the color space and dimensions of the color space represent variables within the color model. Each point is identified by a set of coordinates. All visible colors can be represented by points in a color space.

Figure 1:
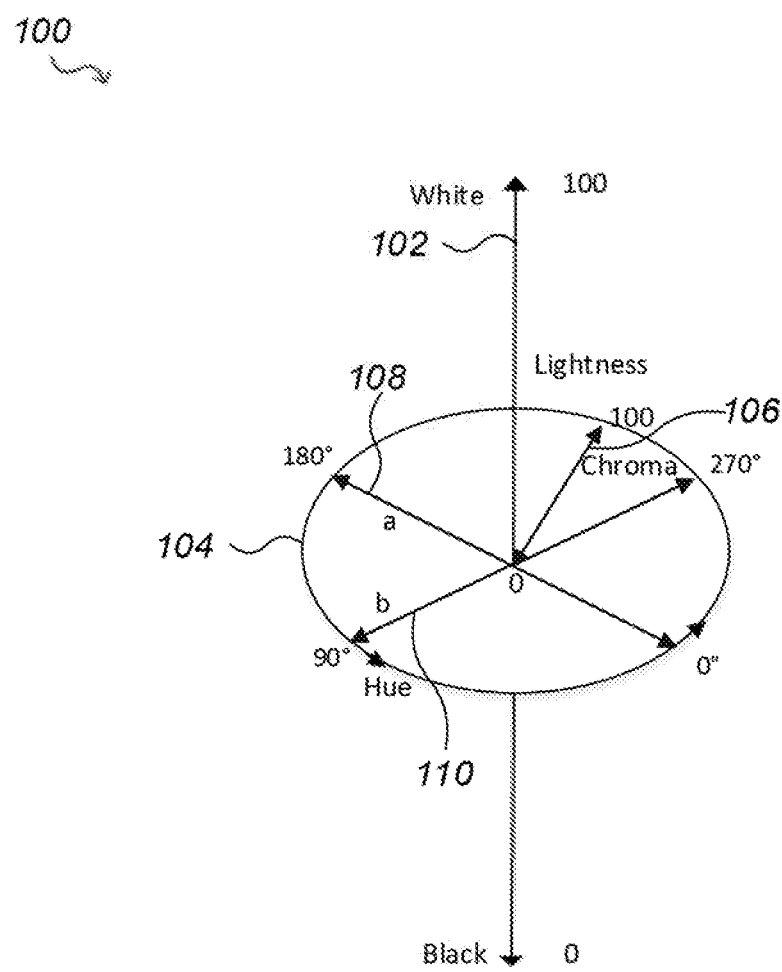
FIG. 1 is an example color space.

FIG. 1 is an example of a both a three dimensional Light Chroma Hue (LCH) color space and an International Commission on Illumination 1976 L*a*b* (CIELAB) color space. THE CIELAB color space defines a lightness variable L 102 and two opposing color dimensions a 108 and b 110, axis a 108 ranging from highly chromatic green through grey to highly chromatic red, and axis b 110 ranging from highly chromatic blue through grey to highly chromatic yellow. Based on the CIE L*a*b* coordinate system any possible visible color can be labeled by a unique set of three Cartesian coordinates (L,a,b), (L) representing its lightness-value and (a) and (b) together representing its hue and chroma.

The LCH color space differs from the CIELAB color space in that LCH uses cylindrical (polar) coordinates and CIELAB uses rectangular (cartesian) coordinates. The coordinates of the CIELAB color space (a) and (b) are orthogonal dimensions whose polar equivalents are hue (an angle) and chroma (a distance from the lightness axis). The LCH color space is a cylindrical color space having three axes corresponding to the variables Chroma. Hue and Lightness. A color defined in the color space comprises a value for each variable. Chrome is the intensity of a color relative to a neutral color such as grey. Chroma may be referred to as colorfulness or saturation. Hue is the color independent of intensity or lightness and is one, or a proportion of two, of the perceived colors, red, yellow, green, and blue.

Referring to the LCH color space of FIG. 1, the lightness axis 102 extends from black (0) to white (100). Chrome is the radius 106 of a circle wherein the centre of the circle is the lightness axis and may represent grey at the lightness axis and highly chromatic furthest from the lightness axis. Hue is often represented on a color wheel 104, ranging from red through yellow, green and blue and back to red, with corresponding hue angles, ranging from 0 to 360 degrees. Thus, hue may be referred to in terms of an angle, and chroma and lightness may be referred to in terms of magnitudes.

Another example of a color space is a Red, Green, Blue (RGB) color space which is an additive color model defining three variables which determine the amount of red, green and blue light. Examples of color spaces which are cylindrical-coordinate representations of the RGB color space include the Hue Saturation Lightness (HSL) color model, Hue Saturation Value (HSV) color model and Hue Saturation intensity (HSI) color model. In these models, the angle around the central vertical axis corresponds to "hue", the distance from the axis corresponds to "saturation", and the distance along the axis corresponds to "lightness", "value" and "intensity" respectively.

Another example of a color space is a Cyan, Magenta, Yellow and Black (CMYK) color space which is a subtractive color model defining four variables which determine the amount of cyan, magenta, yellow and black light. Another example of a color space is the CIE 1931 XYZ color space defining the three tristimulus variables X, Y and Z. Other example color spaces include the CMYKcm color space, CMYKRGB color space and CMYKk color space.

The following description provides examples in the LCH color space but any color space capable of representing a color may be used. The color space corresponding to color coordinates input by or output to a user may differ to the color space used for color mapping. The color coordinates input by or output to a user may depend on a user choice or may be the coordinates used by a tool such as a color harmony tool. For example color coordinates input from or output to a user may be RGB or CIELAB values even if colors are mapped in the LCH color space.

A color palette is a plurality of colors and the color palette can be represented by a plurality of points in a color space, each point corresponding to a color. Each color of the color palette has a relative positional relationship with the other colors of the color palette. For example, if one color of the color palette was adjusted, the relative positional relationship with the adjusted color and other colors of the color palette would change. The term "color harmony" refers to the property that certain aesthetically pleasing color combinations have, i.e. color combinations that are harmonious to the eye. Color harmony rules are the predefined rules which a designer has set in order to achieve the desired color harmony in an image produced using that color palette. The color harmony of a color palette is thus based on the relative positional relationships of colors of the color palette in a color space. Thus, inferred relative positional relationships of locations of colors of a selected color palette in a color space may be taken to be indicative of the predefined color harmony rules for the color palette. For a LCH color space, these relationships could be based on chroma, hue and lightness. It is the specific choices of hue differences and levels of colorfulness and lightness that yield harmonious contrasts and consonances. The relative positional relationship between chroma values of colors is a ratio and the relative positional relationship between lightness values of colors is a ratio. The relative positional relationship between hue values of colors is an angle.

During a design process, a user may select a palette to give a desired color harmony. The level of harmony achieved in the resulting palette of colors may be given as a result of the relative positional relationships of the selected colors within a color space. Changing the positional relationships of the colors, relative to each other, may be considered to produce an overall different color harmony. Thus the positional relationships of the colors of a color palette in a color space define color harmony rules for the palette.

FIGS. 6, 7 and 8 provide examples of color palettes being represented in the LCH color space. For clarity, these figures show a two dimensional plane rather than three dimensional diagram of the LCH color space wherein lightness is kept constant. In this example the circle 604 is the maximum chroma and may be equal to a value of 100. As can be seen in FIG. 6a, there are relative positional relationships between all the color points provided in the color space. For example, the chroma ratio of point 612 to point 610 is approximately 2:1 and the hue angle between point 612 and point 610 is approximately 90°. Further detail of these figures will be provided below.

A rendering system is any system capable of outputting colors. The rendering system is arranged to reproduce an image. In examples described herein, the image contains colors of a color palette. The rendering system may be any color imaging system and may output colors in print, on a display or using a projector. For example, the rendering system may be a printing system for printing an image using a printing fluid such as one or more inks or colorants or the rendering system may be a display device. In another example the rendering system may be a 2D printer or a 3D printer that may print on a bed of build material. The rendering system may be a printer capable of printing colors for applications such as wall covering, signage, textiles canvas, wallpaper, window blinds, wall stickers, car wrapping, rollers, banners, etc.

A color space represents all visible colors. For color spaces, the term "gamut" refers to a multi-dimensional volume forming a subspace of the color space. A gamut may take the form of an arbitrary volume in the color space wherein color values within the volume are available but where color values falling outside the volume are not available.

Rendering systems may be constrained in colors they can reproduce. A rendering system may have certain capabilities and these capabilities may be limited such that the rendering system is unable to output all visible colors of a color space and instead produces a limited spectrum of visible colors within the color space. The colors that a rendering system can output are known as reproducible colors. The term "irreproducible color" refers to a color that the rendering system cannot output because the color does not fit within the capabilities of the rendering system. A color palette is reproducible if all colors of the color palette are reproducible such that a rendering system can reproduce the color palette without adjustment. A gamut demonstrates which colors are reproducible in a rendering system. The rendering system's reproducible color gamut is a volume within the color space wherein color values within the volume are available to the rendering system and can be reproduced by the rendering system but where color values falling outside the volume are not available and are irreproducible colors. When an image containing colors of a color palette produced in a design process is reproduced using a rendering system and one or more colors of the palette are irreproducible, the appearance of one or more of the colors of the rendered image may not match the colors of the designed palette. The resulting image may thus not provide the overall color harmony effect designed for in the design process.

Figure 2:
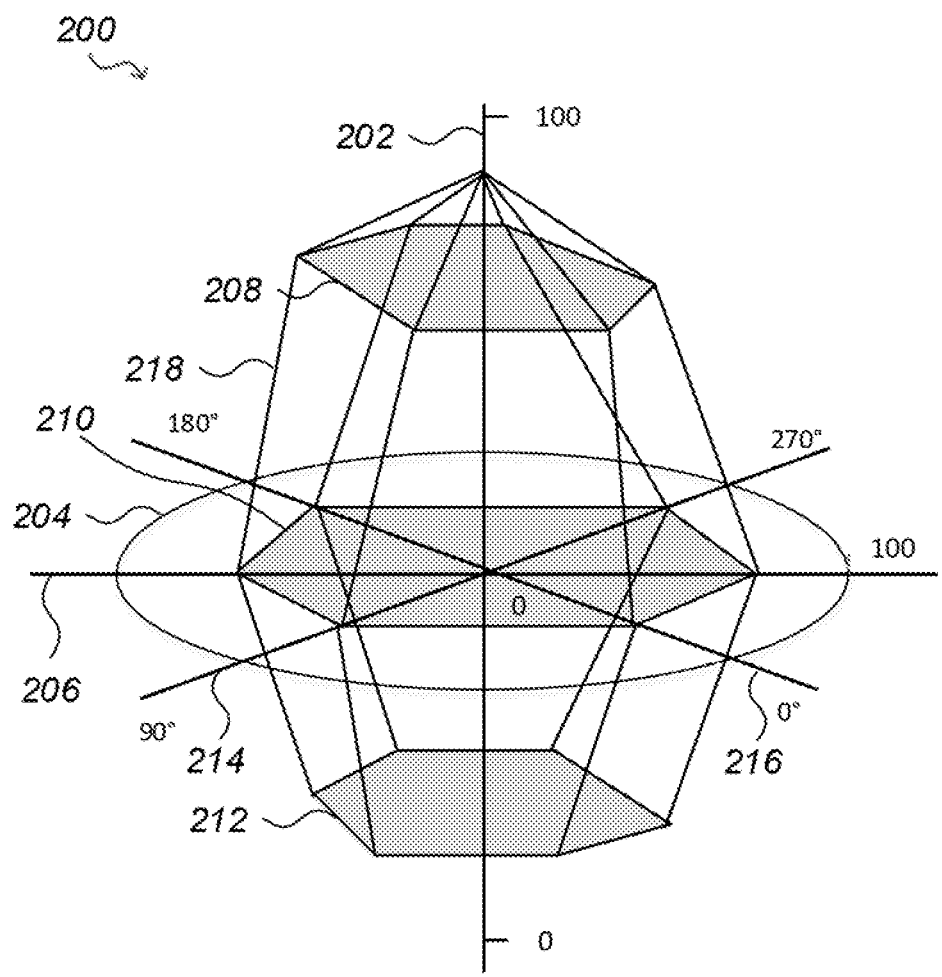
FIG. 2 is an example color gamut in the color space of FIG. 2.

FIG. 2 is an example of a three dimensional limited gamut in the color space of FIG. 1. Lightness is represented by axis 202 and chroma is represented by axis 206, with maximum chroma (also the hue axis) being represented by the circle 204. Axes 214 and 216 illustrate different hue angles. The shaded areas 208, 210 and 212 represent planes of constant lightness. The three dimensional shape 218 represents a boundary where color values inside the boundary can be reproduced by the rendering system and colors outside the boundary are irreproducible. For example, for the gamut of FIG. 2, if a color value has a lightness value of 50 (and may therefore be in the plane of the shaded area 210) and a chroma value of 5, the color will be inside the color gamut and thus reproducible. However if a color has a lightness value of 50 and a chroma value of 95 the color will be irreproducible, regardless of hue angle.

Color mapping is a process by which a first representation of an original color is mapped to a second representation of the color. The mapped color may be the same or similar to the original color. In some examples a color may be mapped to exactly replicate the original color. A color may be the same if it appears the same to the human eye and thus in other examples color mapping may not be mapping a color to exactly replicate the original color but rather mapping of a color to adjust the color by a small amount to produce a color that is close enough in appearance to the original color that the color difference is unnoticeable to the human eye. Color mapping may be the adjustment of coordinates of a color. For example, color coordinates may be adjusted in the same color space due to restrictions such as a limited color gamut. In another example, color mapping may be changing the type of coordinates to map a color to a different color space. A color gamut mapping algorithm implements color mapping. The color gamut mapping algorithm is any manipulation of data corresponding to a color value and may be operated to adjust a value of a color in a color space to comply with a set of rules. For example, a color gamut mapping algorithm may transform a color in a constant-hue plane. In an example color gamut mapping algorithm may manipulate data corresponding to a plurality of color values and may map a whole color space to another color space.

An example of a color gamut mapping algorithm is color difference minimization. In color difference minimization, a color value may be adjusted to comply with a set of rules, such as to be inside a limited gamut, and the color gamut mapping algorithm will try and maintain the appearance of the color so it appears the same to the human eye. For the LCH color space, to maintain the appearance of the color, color difference minimization may use weighting that favors lightness and hue over colorfulness.

Another example of a color gamut mapping algorithm is a compression method wherein colors outside a limited gamut are compressed into the region inside the limited gamut using a quadratic function.

The terms color space, color harmony, color harmony rules, color gamut, color mapping and color gamut mapping algorithm as explained above will be used in the following description.

Figure 3:
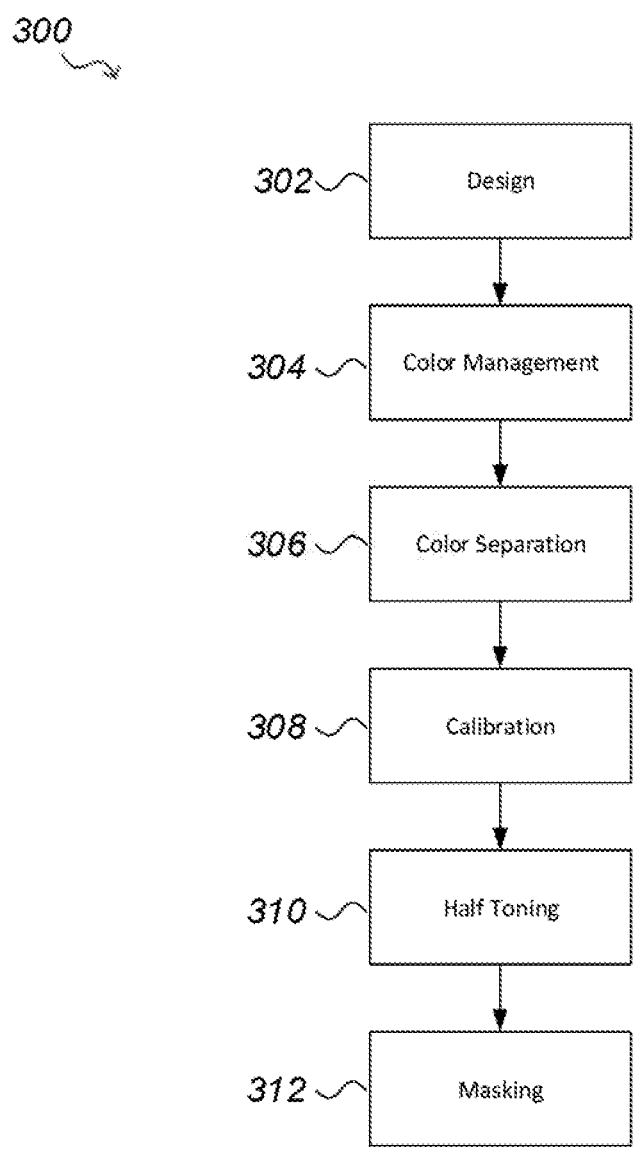
FIG. 3 is an example flowchart of a printing pipeline.

FIG. 3 is an example flowchart of a printing pipeline. This outlines examples of the processes taken to design a color palette and render an image made using the colors of the color palette. In the design process 302 a user initially selects colors and produces color content using knowledge of color spaces and color harmony. For example, a user may construct a color palette using any tool including color harmony tools such as ADOBE Color CC, Paletton.com or a color calculator application. A color calculator application may allow a customer to select one or more colors for a color palette. The selection of the colors of the palette may be taken to define a designer's color harmony rules for the palette, as given by the relative positional relationships between the colors in the color space. Alternatively, predefined or user-defined color harmony rules may be used to generate a set of colors for the color palette that satisfy the color harmony rules. The palette may then be used in decorating a given object or space to generate an image using the colors. Next is color management 304 wherein, knowing the capabilities of a rendering system, colors of an image to be reproduced may be fitted to the capabilities and may be translated to a single representation for rendering, for example RGB or CMYK values. In some examples, following color management is color separation 306 which maps the color representation to printing fluid channels, for example ink channels, of the rendering system. The actual state of a rendering system may differ from the reference state. This may be due to aging of components, conditions of use, environment, print etc. This may cause a rendering system's reproducible gamut to change over time. Therefore, in calibration 308, the rendering system values are adjusted to compensate for this difference. Next is half toning 310, where the discrete placement of drops may be chosen, and the final process is masking 312, where the point at which ink drops are deposited may be chosen.

In the design process 302, the rendering system's reproducible gamut may not be considered by the user. Consequently, in color management 304, if any colors are outside the reproducible gamut, they may be adjusted to be inside the reproducible gamut. For a color palette, each color of the color palette may be adjusted or reproduced individually and therefore the relative positional relationships between colors of the color palette would be broken. Thus, if the user had designed the color palette in accordance with particular color harmony rules to achieve a desired color harmony in the image, these rules may also be broken when the color palette is reproduced by a rendering system if color management 304 has to adjust irreproducible colors of the palette to be reproducible. The user may be using the rendering system to produce a final product and the user would therefore be concerned with selecting the right color harmony of the final product and its parts and with preserving that selected harmony.

In order to render an image with a color palette having a desired harmony, the image is thus passed through the process shown in FIG. 3. A designer can visually inspect the rendered output to assess its quality. If the designer is satisfied with its output the designer may proceed. However, it is only by visual inspection that a designer may recognize in the rendered image that any of the colors of the rendered image has been adjusted compared to the designed palette. The designer may notice that the color harmony of the designed color palette is not achieved in the rendered image. The designer may identify that the desired color harmony is not achieved because an irreproducible color of the color palette has been adjusted in color management 304 to fall inside the reproducible gamut, and that the color harmony rules of the palette may have been broken. To address this, a designer may go back to the color palette design tool to adjust the colors of the color palette to maintain the overall color harmony, to see if the image using the harmonious adjusted palette can be rendered by the rendering system to an acceptable quality. The user may thus take an iterative approach to the rendering pipeline of FIG. 3 to achieve a desired color harmony using trial and error by rendering a number of substrates and visually inspecting the rendered results. However, this is a difficult and often imprecise process that requires repetitive rendering and guess work and can lead to undesirable results, with different color harmony rules being used, when an adjusted color palette that is closer and more harmonious may have been available.

Figure 4:
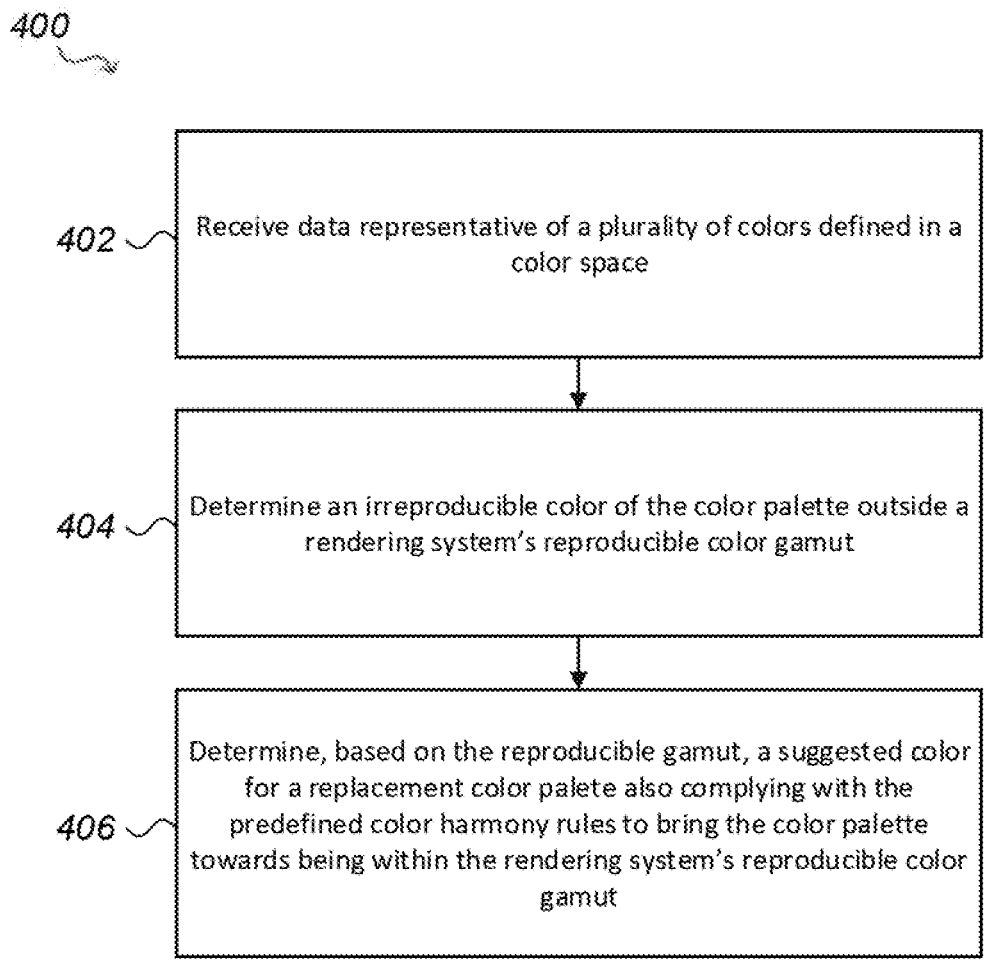
FIG. 4 is an example flowchart of a method of producing suggested colors of a color palette.
Figure 5:
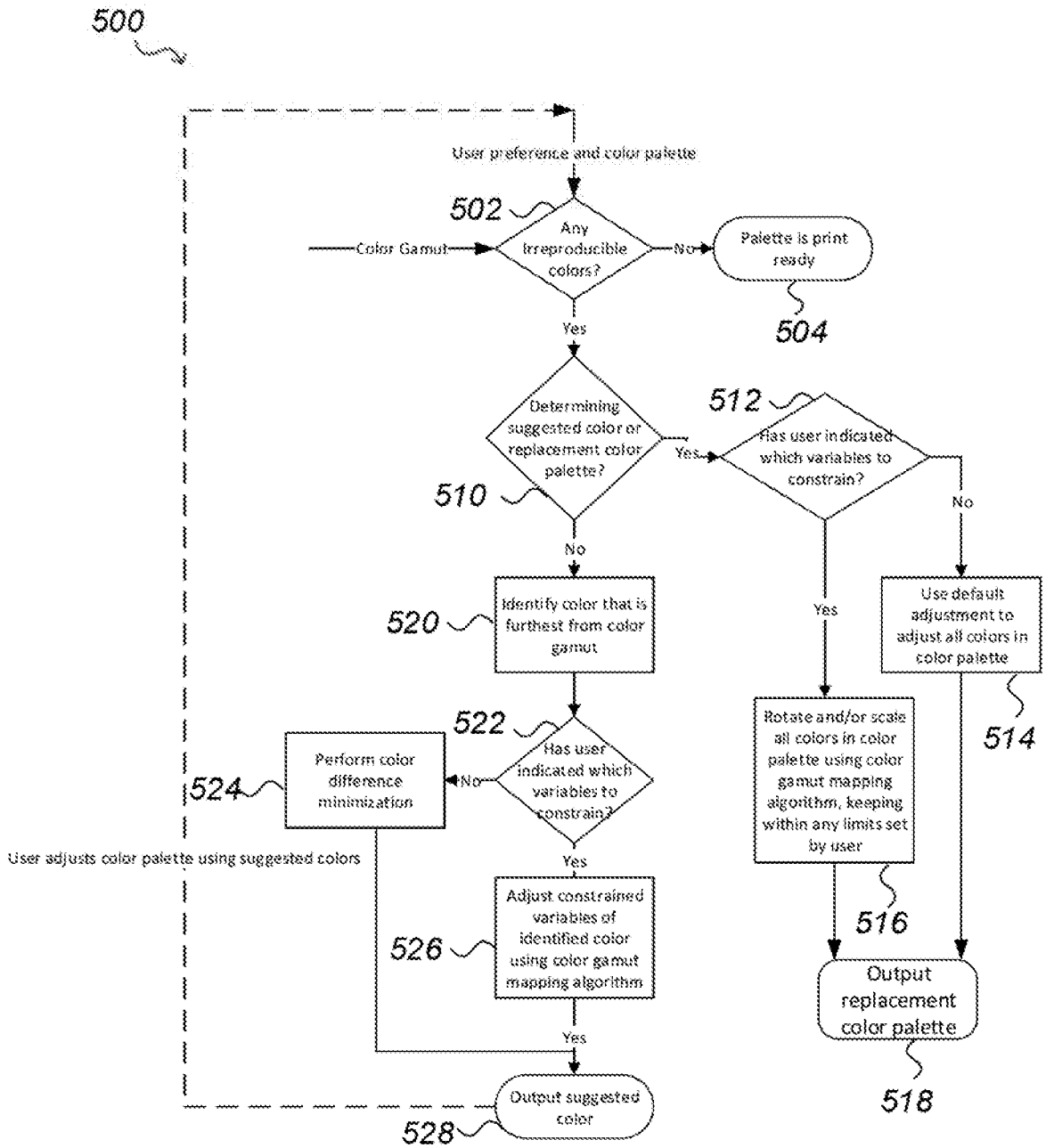
FIG. 5 is another example flowchart of a method of producing suggested colors of a color palette.

FIGS. 4 and 5 provide examples of a method of assistance to a user in a process of rendering a desired color palette by suggesting at least one color to a user that brings the color palette towards being within the rendering system's reproducible color gamut whilst maintaining color harmony. In an example, the method may be provided in the form of a palette checking application to run alongside a tool such as a color harmony tool, in another example, the method for assistance may suggest individual colors to the user to assist the user in their design of a harmonious palette or suggest whole color palettes with preserved color harmony rules to the user so that the user does not have to redesign the original palette. Each suggested color may be a reproducible color that is inside a rendering system's reproducible color gamut. This enables a user to keep using existing color harmony tools whilst designing a reproducible color palette. This reduces or eliminates iterative changes and removes the need for repetitive rendering of a color palette to arrive at a solution.

An effect of the examples described herein is that a user is assisted in designing a color palette with the defined color harmony rules where all colors of the color palette are inside a rendering system's reproducible gamut. An effect of this assistance is that a color palette will be brought towards being within the capabilities of a rendering system while preserving color harmony. Therefore color harmony relationships in a color palette are preserved when it is reproduced in print or using other imaging or rendering technology. Further, the above-described imprecise and laborious manual trial and error aspects of the design process that give suboptimal outcomes can be dispensed with.

The flowchart 400 of FIG. 4 provides an example of method of producing suggested colors of a color palette that comply with color harmony rules. Firstly, data representative of a plurality of colors defined in a color space is received 402 wherein the plurality of colors provide a color palette taken to be related to each other by predefined color harmony rules based on their relative positions in the color space. Next, an irreproducible color of the color palette outside a rendering system's reproducible color gamut is determined 404 wherein the reproducible color gamut was received for a rendering system on which image data comprising colors of the color palette is to be reproduced. Finally a suggested color for a replacement color palette also complying with the predefined color harmony rules is determined 406 based on the reproducible color gamut. This suggested color is determined to bring the color palette towards being within the rendering system's reproducible color gamut.

The flowchart 500 of FIG. 5 provides another example of a method of producing suggested colors of a color palette that comply with color harmony rules. Any sections of the flowchart 500 may be taken individually or in combination.

Inputs to the method 500 may include user indications, a color palette and a color gamut. In an example, the color palette may be input by a user who has designed a color palette using a design tool as mentioned above. In an example, the user indications and/or color palette may be taken from a tool used by the user. In another example, this information may be input by a user into a user interface such as a graphical user interface (GUI). This GUI may also be used for outputting information to the user. In an example, the user interface may be a palette checking application to run alongside a tool such as a color harmony tool. The color gamut may be received from a rendering system or another application and may have previously been calculated using an existing method. In some examples the color gamut may be input by the user via the GUI.

Firstly, it is determined 502 whether any colors of the color palette are irreproducible or whether all of the colors of the palette fit inside the rendering system's reproducible color gamut. To determine if any of the colors of the color palette are irreproducible, each color, represented in a color space, is compared to the color gamut using existing comparison techniques. Alternatively, all colors of the color palette are compared simultaneously to the color gamut. In an example, checking whether all colors of the color palette fit inside the rendering system's reproducible gamut is done on the basis of the system's ICC output color profile, which allows for a computation of the system's color gamut and for checking whether a color is inside it or not. The color gamut may be in the same color space as the color palette. In some examples either the color palette or the color gamut is mapped to ensure both are in the same color space. If a color of the color palette is inside the color gamut, the color is reproducible. If all colors of the color palette are reproducible, the palette is print ready 504 and the method is complete. A color palette is print ready if the color palette does not need adjusting. A user may be notified that the palette print ready and the design process is therefore complete. The user may be notified via the GUI. If, however, any of the colors are outside the color gamut and therefore irreproducible, further processes are performed to assist a user.

In an example it will be determined 510 whether the system is to output a suggested color or a replacement color palette. The decision of 510 controls whether a whole color palette or a suggested color is output. In an example, the system may provide a method of outputting a suggested color as provided in 502, 504, 520, 522, 524, 526 and 528. In another example, the system may provide a method of outputting a replacement color palette as provided in 502, 504, 512, 514, 516 and 518. In an example, it is determined 510 whether the system has the capabilities to perform both methods. In another example, the optimum or default output is determined 510, for example based on the amount of irreproducible colors determined or based on the color harmony rules of the color palette. In another example a user may have indicated whether to determine a suggested color or a replacement color palette. A user may have indicated by maintaining or adjusting a setting or inputting details into a GUI.

If it has been decided 510 that a replacement color palette should be determined, all colors of the color palette are mapped in a corresponding way to produce the replacement color palette. For example, a color gamut mapping algorithm may be operated to adjust the location in color space of all colors of the color palette by the same amount. If the color space is the LCH color space, the color gamut mapping algorithm may be operated to adjust all colors of the color palette by the same hue angle and/or scaling in chroma and/or translation or scaling in lightness in order to maintain relative positional relationships. The replacement color palette may be inside a rendering system's reproducible gamut and is determined to satisfy predefined color harmony rules. First, it is decided 512 whether a user has indicated which subset of the variables of the color space, for example variables hue, chroma and lightness, to constrain for the operation of a color gamut mapping algorithm, wherein the color gamut mapping algorithm is operated to adjust the color locations in color space along each variable selected by the user and not along a variable not selected by the user. In another example, a user is not provided with a choice of variables to constrain but rather the color gamut mapping algorithm operates using a default adjustment.

If a user has indicated which variables to constrain, all colors of the color palette are mapped using a color gamut mapping algorithm corresponding to the variables constrained by the user. For example, for a color palette in the LCH color space, all colors may be rotated and/or scaled 516 using a color gamut mapping algorithm to keep within any limits or constraints set by a user. A user may choose whether to scale the chroma and/or lightness and/or to rotate the hue. A user may indicate a maximum threshold for hue angle and/or scaling factor and/or lightness translation and the operation of a color gamut mapping algorithm is based on the user indication. For example a user may indicate a limit of 20% chroma reduction and a limit of 15° rotation. A color gamut mapping algorithm may then map all colors based on the user indication.

For example, if a user indicates that chroma is to be scaled and no other variable can be manipulated, the color gamut algorithm may find the one scaling factor that can be applied to the chroma of all the colors of the color palette until they are all in-gamut. The color gamut mapping algorithm may achieve this by computing scaling factors per color and picking the smallest one. If a user indicates that lightness can be scaled and no other variable can be manipulated, the color gamut algorithm may find the one scaling factor that can be applied to the colors' distance from the center of the color gamut's lightness range. The color gamut mapping algorithm may achieve this using the same technique as above.

For example, if a user indicates that a color palette can be rotated in hue angle and no other variable can be manipulated, the color gamut mapping algorithm may rotate the hue angle. The algorithm may find the smallest change in hue angle using bisection or other minimization techniques. Rotation without manipulation of another variable may not always lead to a solution. For example if one of the colors of the color palette has a chroma greater than the print gamut's maximum chroma, or if the angular differences and chromas are such that they would not fit into the print gamut, no matter what their rotation. It may therefore be that the color gamut mapping algorithm also uses scaling. The color gamut mapping algorithm may perform this scaling automatically or output an option to the user using the GUI and receive an indication of the constraints.

In an example, a user may not indicate any variables to constrain or may indicate that all variables are constrained. In another example it may not be possible for a user to indicate which variables to constrain. A color gamut mapping algorithm may therefore use a default adjustment 514 to adjust all colors of the color palette. Additionally, instead of asking a user for an indication, a default adjustment 514 could be used. The color gamut mapping algorithm may make changes to both angle and scaling factor at the same time. For example, a color gamut mapping algorithm may use gradient descent in a scaling-angle space, where total distance of out-of-gamut color differences may be used as the metric to minimize. Alternatively, multiple variants may be computed without iteration, by taking each palette color in turn, computing the optimum rotation for it, applying that rotation to the whole palette and then applying scaling to bring all of the palette color in-gamut. As many scaled-rotated alternatives as there are palette colors may result and the one with the best metric may be selected.

After all colors of the color palette have been mapped, the suggested replacement color palette may be output to a user. This output may be via the GUI. When a suggested color or color palette is output to a user, this may be in the form of color coordinates. Examples of provided color coordinates are RGB or CIELAB values. The end result is a new set of color coordinates for all palette entries, without the need to iterate or to return to the color harmony tool to design a new color palette. A user can therefore design a color palette with defined color harmony rules and, if the color palette is irreproducible, be provided with a replacement color palette with the color harmony rules maintained where all colors of the color palette are inside a rendering system's reproducible gamut. This simplifies a user's design process.

Alternatively, it may be decided 510 that a suggested color of the color palette should be determined. The suggested color may be determined by operating a color gamut mapping algorithm to adjust a location in color space of the irreproducible color. The irreproducible color to adjust may be the color furthest outside the rendering system's reproducible gamut and this color is therefore identified 520. Alternatively, a color to adjust may be selected by the user or may be dependent on the importance of the variables in a color space, such as hue, chroma and lightness. If the color is a point in the LCH color space, the operation of the color gamut mapping algorithm may be based on hue, chroma and/or lightness. A user input may indicate which subset of the variables of the color space to constrain for the operation of a color gamut mapping algorithm, wherein the color gamut mapping algorithm is operated to adjust the color location in color space along each variable selected by the user and not along any variables not selected by the user. For example, for a color palette in the LCH color space, a user may choose to constrain a subset of the variables chroma, hue and lightness. A user input may also indicate maximum thresholds for constraints of variables. If a user has not indicated which variables to constrain or if there was no option fore user to indicate which variables to constrain, the color gamut mapping algorithm may perform color difference minimization 524 on the color identified as furthest outside the reproducible gamut.

If the user has indicated 522 which variables to constrain, the constrained variables of the color identified as furthest outside the reproducible gamut may be adjusted 526 using a color gamut mapping algorithm. For example, for a color palette in the LCH color space, a user may choose at least one of the variables chroma, hue and lightness to favor. The color gamut mapping algorithm may then adjust the two other variables of the identified color to produce a suggested color. When a user has favoured lightness, a minimization in a plane of constant lightness can be performed, when a user has favoured chroma then the minimization can be done in cylinders of constant chroma and when a user has favoured hue color difference minimization can be performed in planes of constant hue.

The suggested color is then output to the user 530. The suggested color may be output via the GUI. The user can then input the suggested color coordinates into a tool such as a color harmony tool to produce a replacement color palette with defined color harmony rules. The suggested color may be input as a replacement to the color identified as irreproducible. When the color is replaced, due to the predefined harmony rules, this may change all colors of the color palette. Consequently the user will have a color palette which complies with color harmony rules and where at least the identified color is inside a rendering system's reproducible gamut. The suggested color therefore provides the user with a starting point so as to produce a replacement color palette from their desired color palette which complies with the predefined color harmony rules. The method 500 of FIG. 5 therefore brings the color palette towards being within the rendering system's reproducible color gamut whilst preserving color harmony rules.

In an example, the user may input the replacement color palette produced into the beginning of the flowchart 502. If all colors are found to be reproducible, the color palette is reproducible. If there are still irreproducible colors, the method 500 can be iteratively performed using the replacement color palette as an input until all colors of the color palette are inside a rendering systems reproducible gamut. The user will not have to print or perform guess work with this iteration. Because the user produced the palette based on an adjusted color, the relative positional relationships between the colors can be maintained, preserving color harmony rules. Thus the determination and provision, which can be iterative, of the suggested color brings the color palette towards being within the rendering system's reproducible color gamut whilst maintaining color harmony.

Although it is demonstrated that one color is identified and adjusted, it is possible for more colors to be adjusted in a corresponding way. It may be that one color is identified because a user indicated to adjust one color or because that is the default setting. However a user may have indicated more than one suggested color to be determined. If, for example, a user indicated for two odors to be determined, the two colors furthest from a color gamut would be determined 520 and adjusted 524 or 526 in a corresponding way. The outputted suggested colors can then be used by the user as above.

FIGS. 6, 7 and 8 provide examples of color palette adjustments using a color gamut mapping algorithm. FIG. 6 provides an example of 526 of FIG. 5. FIGS. 7 and 8 provide examples of 516 of FIG. 5. For clarity, these figures show a two dimensional rather than three dimensional chroma-hue circle in a plane of constant lightness. The circles 604, 624, 704, 724, 804 and 824 represent the chroma limit. The enclosed shapes 602, 622, 702, 722, 802 and 822 represent the rendering system's reproducible gamut. The points within the circle represent the individual colors and all the points in a circle represent a color palette. These colors may have different lightness values, but for clarity the points corresponding to each color are all shown in a constant lightness plane.

FIG. 6 illustrates an example of the adjustment 526 wherein the chroma variable of one color has been adjusted. FIG. 6 includes FIG. 6a which shows an example color palette before the adjustment 526 and FIG. 6b which shows the example color palette after the adjustment 526. In FIG. 6a, the colors of the color palette are represented by points 606, 608, 610, 612 and 614. The points 608, 610 and 614 are inside the reproducible gamut and are therefore reproducible. The points 612 and 606 are outside the reproducible gamut and are therefore irreproducible. In 526 of FIG. 5, the color identified as furthest from the reproducible gamut is adjusted using a color gamut mapping algorithm. In FIG. 6a, the color identified as furthest from the reproducible gamut is point 612. Therefore this paint may be moved inside by adjusting the variables chroma, lightness and hue. FIG. 6b shows a color palette after adjustment of one color. In this example, the point 612 furthest from the reproducible gamut has been mapped by adjusting the chroma value of the color and the adjusted point 632 is now inside the reproducible gamut. The color value of the point 632 may be output to the user as a suggested color. This output may be in the form of color coordinates such as RGB or CIELAB values. The user can then enter these coordinates into a color harmony tool. This ensures a user can maintain relative positional relationships and provides the user with a starting point so as to produce their desired color palette with defined color harmony rules. This brings the color palette towards being within the rendering system's reproducible color gamut whilst preserving color harmony rules.

FIG. 7 illustrates an example of the adjustment 516 wherein all colors are adjusted by scaling in chroma. FIG. 7 includes FIG. 7a which shows an example input color palette before the adjustment 516 and FIG. 7b which shows the example replacement color palette after the adjustment 516. In FIG. 7a, the colors of the color palette are represented by points 706, 708, 710, 712 and 714. The points 708, 710 and 714 are inside the reproducible gamut and are therefore reproducible. The points 712 and 706 are outside the reproducible gamut and are therefore irreproducible. In 516 of FIG. 5, all colors in the color palette are scaled and/or rotated. The points of FIG. 7b differ from those of FIG. 7a in that the chroma values of each point have been scaled down. However the relative positional relationships between points has been maintained between FIG. 7a and FIG. 7b. Thus color harmony rules have not been broken and color harmony has been preserved.

FIG. 8 illustrates an example of the adjustment 516 wherein all colors are adjusted by rotating the hue angle. FIG. 8 includes FIG. 8a which shows an example input color palette before the adjustment 516 and FIG. 8b which shows the example replacement color palette after the adjustment 516. In FIG. 8a, the colors of the color palette are represented by points 806, 808, 810, 812, 814 and 816. The points 808, 810 and 812 are inside the reproducible gamut and are therefore reproducible. The points 806, 814 and 816 are outside the reproducible gamut and are therefore irreproducible. In 516 of FIG. 5, all colors in color palette are scaled and/or rotated. The points of FIG. 8b differ from those of FIG. 8a in that all points have been rotated because the hue angle of each point has changed. The change in angle is the same for all points and the magnitude of the chroma and lightness has not changed from FIG. 8a to FIG. 8b. Therefore the relative positional relationships between points has been maintained between FIG. 8a and FIG. 8b. Thus color harmony rules have not been broken and color harmony has been preserved.

FIG. 9 is a schematic diagram illustrating an example apparatus 900 to implement examples described herein. The apparatus 900 may include a computer system 902 to implement the examples. The computer system 902 may contain a processor 904, a memory 906 and a computer interface 908. The processor may perform the examples described herein. The memory may store an instruction set to cooperate with the processor and storage to enable the examples to be performed. The apparatus 900 may also contain a rendering system such as a printer 916 with a printer interface 914. The printer interface 914 and the computer interface 908 may be in communication. In an example the printer interface 914 may send a reproducible gamut to the computer interface 908. The apparatus 900 may contain a screen 910 including a user interface 912. The screen 910 may receive user inputs such as color gamut and variables to constrain. The user interface 912 may be in communication with the computer interface 910. For example the user interface 912 may send the user inputs to the computer interface 908. The computer interface 908 may transfer the received data to the processor to perform examples described herein.

Although these modules are shown separately, it may be that a combination of modules are provided instead. Individual parts of this apparatus may be omitted. For example the printer may be omitted if the computer system is aware of the printers reproducible gamut. Additionally, other modules may be included which are not shown.

The invention claimed is:

1. A method comprising:
receiving data representative of a plurality of colors defined in a color space, the plurality of colors providing a color palette taken to be related to each other by predefined color harmony rules based on their relative positions in the color space;
determining an irreproducible color of the color palette outside a rendering system's reproducible color gamut, the reproducible color gamut having been received for a rendering system on which image data comprising colors of the color palette is to be reproduced;
determining, based on the reproducible color gamut, a suggested color for a replacement color palette also complying with the predefined color harmony rules to bring the color palette towards being within the rendering system's reproducible color gamut; and
iteratively performing the method using the replacement color palette as the color palette until it is determined that all colors of the replacement color palette are inside a rendering system's reproducible color gamut.

2. The method of claim 1, wherein the suggested color is a reproducible color that is inside a rendering system's reproducible color gamut.

3. The method of claim 1, the inferred relative positional relationships of locations of colors of the color palette in a color space taken to be indicative of the predefined color harmony rules for the color palette.

4. The method of claim 1, wherein the color space is a cylindrical color space having three axes representing hue, chroma and lightness values and a color defined in the color space comprises a value in each axis.

5. The method of claim 1 further comprising a user indicating the number of suggested colors to be determined.

6. The method of claim 1, wherein the suggested color is determined by operating a color gamut mapping algorithm to adjust a location in color space of the irreproducible color.

7. The method of claim 1, wherein the determining of the irreproducible color of the color palette comprises determining the color of the color palette that is furthest from a rendering system's reproducible color gamut.

8. The method of claim 1 further comprising outputting the suggested color to a user to enable production of a replacement color palette that complies with the predefined color harmony rules.

9. The method of claim 1, wherein determining the suggested color comprises determining a replacement color palette that is inside a rendering system's reproducible color gamut wherein the replacement color palette is determined to satisfy predefined color harmony rules.

10. The method of claim 1, wherein a color gamut mapping algorithm is operated to adjust all colors of the color palette by the same hue angle and/or scaling in chroma and/or translation in lightness in order to maintain relative positional relationships.

11. The method of claim 1 further comprising receiving a user input indicating which subset of the variables of the color space to constrain for the operation of a color gamut mapping algorithm, wherein the color gamut mapping algorithm is operated to adjust the color location in color space along each variable selected by the user.

12. The method of claim 1 further comprising a user indicating a maximum threshold for hue angle and/or scaling factor and/or lightness translation and the operation of a color gamut mapping algorithm based on the user indication.

13. A computer system comprising:
a processor;
a storage coupled to the processor; and
an instruction set stored on the storage to cooperate with the processor and storage to:
receive data representative of a color palette, the color palette comprising a plurality of colors with predefined color harmony rules based on relative positions of the colors in a color space;
receive a reproducible color gamut for a rendering system on which image data comprising colors of the color palette is to be reproduced;
determine an irreproducible color of the color palette outside the rendering system's reproducible color gamut; and
provide a color gamut mapping algorithm that is configured to determine, based on the reproducible color gamut, a suggested color for a replacement color palette also complying with the predefined color harmony rules to bring the color palette towards being within the rendering system's reproducible color gamut; and
iteratively use the replacement color palette as the color palette until it is determined that all colors of the replacement color palette are inside a rendering system's reproducible color gamut.

14. The computer system of claim 13 further comprising a user interface configured to receive user input wherein the operation of the instruction set is based on the received user input.

15. The computer system of claim 13, the inferred relative positional relationships of locations of colors of the color palette in a color space taken to be indicative of the predefined color harmony rules for the color palette.

16. The computer system of claim 13, wherein the color space is a cylindrical color space having three axes representing hue, chroma and lightness values and a color defined in the color space comprises a value in each axis.

17. The computer system of claim 13, wherein the determining of the irreproducible color of the color palette comprises determining the color of the color palette that is furthest from a rendering system's reproducible color gamut.

18. The computer system of claim 13, wherein the determining of the suggested color comprises determining a replacement color palette that is inside a rendering system's reproducible color gamut wherein the replacement color palette is determined to satisfy predefined color harmony rules.

19. The computer system of claim 13, wherein the color gamut mapping algorithm is operated to adjust all colors of the color palette by the same hue angle and/or scaling in chroma and/or translation in lightness in order to maintain relative positional relationships.

20. The computer system of claim 13, wherein a user input indicates one or both of:
which subset of the variables of the color space to constrain for the operation of a color gamut mapping algorithm, wherein the color gamut mapping algorithm is operated to adjust the color location in color space along each variable selected by the user;
a maximum threshold for hue angle and/or scaling factor and/or lightness translation and the operation of a color gamut mapping algorithm based on the user indication.

* * * * *